2,434,950

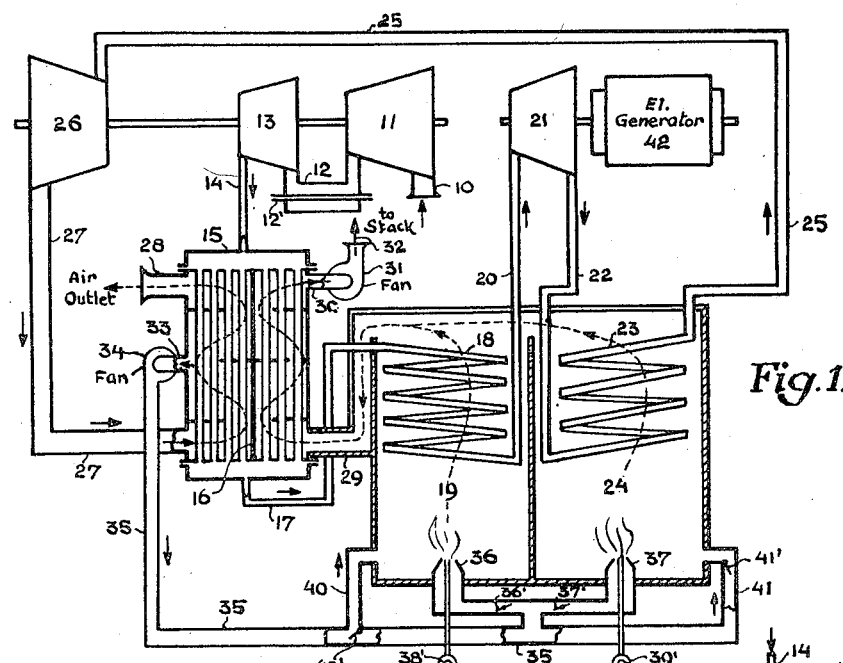
Fig.1.
Fig.2.
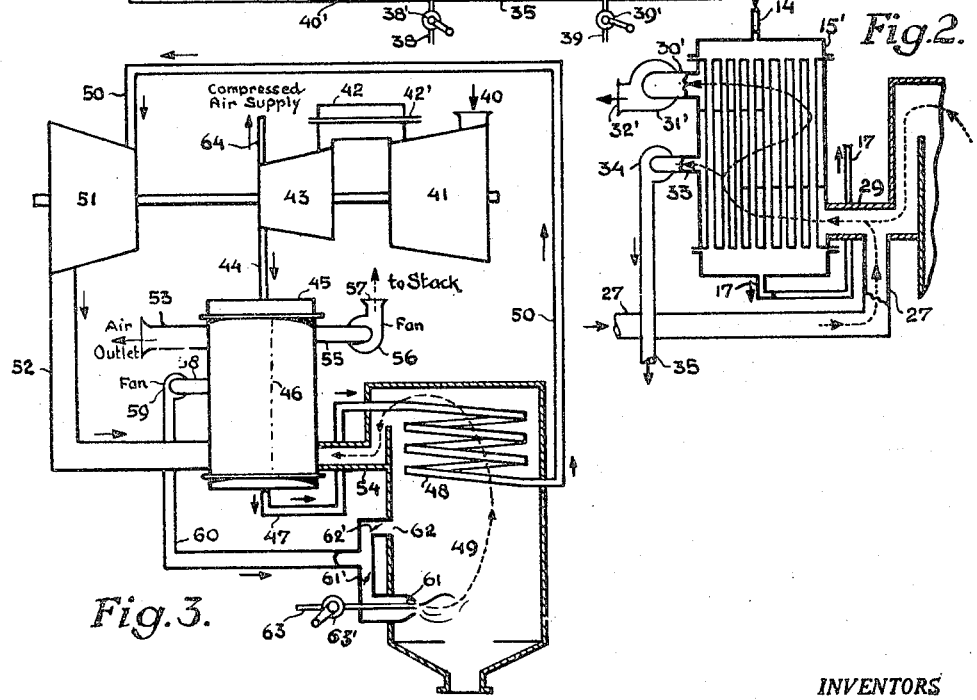
Fig.3.
INVENTORS
Frederick Nettel.
Johann Kreitner Patented Jan. 27, 1948

UNITED STATES PATENT OFFICE 2,434,950

AIR SUPPLY ARRANGEMENT FOR HOT-AIR POWER PLANT FURNACES

Frederick Nettel, Manhasset, and Johann Kreitner, New York, N. Y.

Application October 26, 1944, Serial No. 560,475

3 Claims. (Cl. 60—59)

This specification is a continuation in part of our co-pending application Ser. No. 401,703 filed July 10, 1941, since matured into Patent No. 2,394,253, and deals with air expansion power systems of the continuous combustion type using open power cycles.

The broad object of this invention is to improve the efficiency of such plants in a simple manner and to make possible the utilization of solid fuels such as coal, coke, lignite, peat and the like, or lowest grade liquid fuels such as tar, pitch, asphalt for examples.

The object is achieved by burning in a furnace fuel in a portion of the expanded air issuing from an expansion machine branched off after said air has passed through part of a recuperative heater for the compressed air coming from the compressor of the system, and by leading the gases resulting from the combustion in said furnace also in surface heat transfer relation to the compressed air in a stream preferably separate from that of the expanded air.

A specific object is achieved by leading the combustion gases as described before, but instead of flowing in two separate streams, gases and expanded air are mixed while flowing through said recuperative heater.

In the drawing affixed to this specification and forming part thereof, several embodiments of this invention are illustrated diagrammatically by way of non-limiting examples as follows:

Fig. 1 shows an example for utilizing pulverized fuel or lowest grade liquid fuels.

Fig. 2 represents a detail of an alternative embodiment of a plant as per Fig. 1.

Fig. 3 illustrates an arrangement for production of compressed air, otherwise similar to Fig. 1.

Practical fuel burning devices of different types such as grates, stokers, pulverized fuel mills and burners impose for mechanical, metallurgical and maintenance reasons different temperature limits for the combustion air used. Grates and stokers generally limit the forced draft air to about 200 deg. C.; underfeed stokers sometimes allow to exceed this limit somewhat. Higher air temperatures are generally permissible in pulverized coal firing plants, the limits being determined in this case by the nature of the coal.

Exhaust temperatures of modern air turbines are already today very high and will increase further in future with increasing top temperatures in the power plants. Thus the necessity arises to supply the combustion air economically and simply at suitable temperatures without employing separate air heaters for this purpose only. It will become clear from the following description that the present invention solves this problem in a novel and most satisfactory manner while permitting highest plant efficiencies to be reached.

While leading the combustion gases separately from the expanded air or mixed with the latter can be practised according to this invention, the former arrangement is the preferred one because the pure air rejected from the plant is still rather warm and can be utilized for sundry purposes and because the stack has to be designed for a smaller gas volume.

The plant as per Fig. 1 operates as follows: Air at 10 is taken into compressor 11, passed through intercooler 12, equipped with tube system 12' for the cooling medium, thence into compressor 13, out via pipe 14 into recuperative heater (heat exchanger) 15. A wall 16 divides the heating side of said heater into two separate passages, the purpose of which will be described later. The compressed air leaves 15 through pipe 17 to flow through the heater coil 18 disposed in the fuel burning furnace 19, and thence through pipe 20 to the inlet of air turbine 21 where it expands partially while producing power to drive the electric generator 42. From turbine 21 the air flows via pipe 22 through a second heater coil 23, disposed in a second fuel burning furnace (reheater furnace) 24, thence via pipe 25 into turbine 26 where it expands further to near-atmospheric pressure while developing power to drive compressors 11 and 13 and leaves through pipe 27. This pipe is connected to the left hand passage of said recuperative heater 15, in which the expanded air flows upwards in heat exchange relation to the compressed air flowing downwards through the tube system of said heater, as indicated by the dotted lines. As can be seen from the drawing the expanded air is offered two outlets from said heater; one at the upper end through pipe 28 to the atmosphere, the other through pipe 33. Pipe 33 leads to the draft fan 34 from which it is discharged through pipe 35 to the fuel burners 36 and 37 and to the furnaces 19 and 24 respectively by pipes 40 and 41. The flap valves 36' and 37' permit regulation of the air flowing to the burners 36 and 37, respectively. At the branching points of pipes 40 and 41 from pipe 35 throttle flaps 40' and 41' are disposed. Pipes 38 and 39 are fuel pipes connected to a fuel source for pulverized or liquid fuel (not shown). Valves 38' and 39' permit regulation of the fuel flow to burners 36 and 37 in accordance with load requirements of generator 42.

It can be seen that the air taken out of the recuperative heater 15 at 33 is colder than that of the air discharged from the turbine 26 through pipe 27, but hotter than the air discharged from said heater through pipe 28 to the atmosphere. By proper selection of the branching point 33 the temperature of the air used as combustion air in furnaces 19 and 24 can be chosen to suit the characteristics of the fuel burning device used and/or of the fuel burned.

The combustion gases produced in furnaces 19 and 24 leave as indicated by dotted lines through duct 29 to enter the right hand side passage of the recuperative heater 15, pass through in heat exchange relation to the compressed air in the tube system of said heater and out through pipe 30, induced draft fan 31, and to the stack at 32 which carries gases only.

Fig. 2 shows an alternative design for the recuperative heater 15' with modified inlet for the expanded air from turbine 26, directly applicable to the arrangement shown in Fig. 1. As can be seen, heat exchanger 15' has no dividing wall on the heating side. The pipe 27 from turbine 26 joins up with duct 29 in front of heater 15' so that a mixture of gases from the furnaces and of the expanded air flows through 15'. Again two exit passages from said heater are offered to that mixture. One at the end of the heater through pipe 30', fan 31' to stack at 32', the other disposed nearer to the inlet of the mixture at 33, via draft fan 34, pipe 35 to the furnaces as shown in Fig. 1.

In this case not pure air, but a mixture of expanded air with furnace gases is utilized as combustion supporting medium in the furnaces. This is possible because the oxygen content of this mixture is high enough for the purpose. Again, as in the case of the arrangement as per Fig. 1, the temperature of the mixture blown into the furnaces can be suitably chosen by proper selection of the location of point 33.

Fig. 3 illustrates an arrangement according to this invention in which instead of mechanical power, compressed air is produced. The plant operates as follows: Air taken in at 40 is compressed in 41 intercooled in 42 by tube system 42' for cooling medium, further compressed in 43. At the highest pressure point the compressed air is partly discharged through pipe 64 to a compressed air supply system (not shown), partly it flows via pipe 44 to the recuperative heater (heat exchanger) 45 with dividing wall 46, generally of the same design as heater 15 in Fig. 1. From 45 the compressed and heated air continues through pipe 47 to the heater coil 48, disposed in fuel burning furnace 49, where it is heated further by combustion gases. From coil 48 the air enters air turbine 51 via pipe 50 in which it expands to near-atmospheric pressure while producing power to drive compressors 41 and 43, leaving through pipe 52. This side is in communication with the left hand side passage of heater 45, through which a path is offered to the expanded air partly out at 53 to the atmosphere, and partly out through pipe 58 via draft fan 59, pipe 60 to the furnace at 62 and to the burner 61 suitable for pulverized, liquid or gaseous fuels. Flap 61' controls the air inlet to burner 61 while flap 62' similarly controls the air inlet to the furnace at 62 (secondary air). Fuel is fed to the burner from a suitable supply source (not shown) through pipe 63 provided with regulation valve 63'. The combustion gases from furnace 49 flow as indicated by the dotted line through duct 54 in communication with the right hand side passage through heater 45 and out through pipe 55, via induced draft fan 56 to the stack at 57. It is obvious that also in this case the branching off of the combustion air from heater 45 at 58 fully achieves the object of this invention. The particular hook-up shown for air compression does not form part of this invention.

Generally the type and hook-up of the compressors and expanders are immaterial for the purposes of this invention. It is further immaterial what kind of power consuming device is driven by the expanders or whether the power system serves to supply compressed air instead of mechanical power. While preferred embodiments of the invention have been illustrated, it is to be understood that the invention is not limited in its scope to the embodiments shown (except as defined in the appended claims) but may be embodied in other forms of apparatus which may or may not employ certain characteristic features of the invention to the exclusion of others.

What we claim is:

1. In an air expansion power system of the continuous combustion type including conduit means to take in a continuous stream of air from the atmosphere, means to compress it, an expansion machine disposed to develop power, conduit means including heat exchange surfaces connecting the outlet of said compressing means to the inlet of said expansion machine, conduit means including heat exchange surfaces connecting the outlet of said expansion machine to the atmosphere, said third conduit means being arranged in heat exchange relation to said second conduit means, a fuel burning furnace adapted to use an air stream of predetermined temperature as combustion air, conduit means including heat exchange surfaces for leading the combustion gases from said furnace to the atmosphere, said fourth conduit means being also arranged in heat transfer relation to said second conduit means, means for branching a part stream off said third conduit means at a point along the heat transfer path in said conduit means where the temperature of the expanded air is substantially higher than at the outlet from, and substantially lower than at its inlet to said heat transfer surfaces in said third conduit means, and conduit means connecting said branch point to said furnace for supplying combustion air of predetermined temperature.

2. In an air expansion power system of the continuous combustion type including conduit means to take in a continuous stream of air from the atmosphere, means to compress it, an expansion machine disposed to develop power, conduit means including heat exchange surfaces connecting the outlet of said compressing means to the inlet of said expansion machine, conduit means including heat exchange surfaces connecting the outlet of said expansion machine to the atmosphere, said third conduit means being arranged in heat transfer relation to said second conduit means, a fuel burning furnace adapted to use a gas stream containing free oxygen as combustion supporting medium, conduit means for leading the combustion gases from said furnace into said third conduit means, and for admixing them to the expanded air stream issuing from said expansion machine, means for branching a part stream off said mixture at a point along its heat transfer path in said third conduit means where the temperature of said mixture is substantially higher than at the outlet from said heat transfer path and substantially lower than the temperature of the expanded air at the joining point of said third and fourth conduit means, and conduit means connecting said branching point to said furnace for supplying said mixture as combustion supporting medium of predetermined temperature.

3. In an air expansion power system of the continuous combustion type, comprising means to take in a continuous stream of air from the atmosphere, means to compress it, means to heat it by heat transfer from the system's exhaust air and from fuel combustion gases, said means including a fuel burning furnace adapted to use an oxygen containing stream of predetermined temperature as combustion supporting medium, and means to expand the compressed and heated air for developing power, branch conduit means connecting said furnace to said heat transfer means for supplying oxygen that has passed through said expansion means as combustion supporting medium to said furnace, said branch conduit means being connected to a point of said heat transfer means where the temperature of the oxygen is substantially lower than at the outlet from said expansion means and substantially higher than at the outlet from said heat transfer means.

FREDERICK NETTEL.
JOHANN KREITNER.

REFERENCES CITED

The following references are of record in the file of this patent:

UNITED STATES PATENTS

| Number | Name | Date |
| --- | --- | --- |
| 667,744 | Stolze | Feb. 12, 1901 |
| 1,277,895 | Foster | Sept. 3, 1918 |
| 1,281,016 | Jacobus | Oct. 8, 1918 |
| 1,388,480 | Paris | Aug. 23, 1921 |
| 1,864,448 | Lorenzen | June 21, 1932 |
| 2,172,708 | Karrer | Sept. 12, 1939 |
| 2,268,270 | Traupel | Dec. 30, 1941 |
| 2,305,785 | Jendrassik | Dec. 22, 1942 |

FOREIGN PATENTS

| Number | Country | Date |
| --- | --- | --- |
| 20,853 | Great Britain | Nov. 19, 1900 |
| 292,292 | Great Britain | June 21, 1928 |
| 274,441 | Great Britain | Aug. 30, 1938 |